United States Patent
Strong

(10) Patent No.: US 7,703,587 B2
(45) Date of Patent: Apr. 27, 2010

(54) ROD GUIDE FOR MONOTUBE SHOCK ABSORBERS

(75) Inventor: Daniel J. Strong, Clinton Township, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/699,907

(22) Filed: Jan. 30, 2007

(65) Prior Publication Data

US 2008/0179149 A1    Jul. 31, 2008

(51) Int. Cl.
*F16F 9/36*    (2006.01)
(52) U.S. Cl. ................................ 188/322.17
(58) Field of Classification Search ................ 188/322.16–322.18
See application file for complete search history.

(56) References Cited

U.S. PATENT DOCUMENTS

| | | | | |
|---|---|---|---|---|
| 4,166,523 A * | 9/1979 | Fujii et al. | ............. | 188/322.17 |
| 4,995,485 A * | 2/1991 | Nakamura et al. | ...... | 188/322.17 |
| 5,441,132 A * | 8/1995 | Pradel et al. | ................ | 188/315 |
| 5,531,299 A * | 7/1996 | Bataille | .................. | 188/322.17 |
| 6,253,661 B1 | 7/2001 | Fenn et al. | | |
| 6,390,258 B1 * | 5/2002 | Hofmann et al. | ........ | 188/322.17 |
| 6,547,046 B2 * | 4/2003 | Yamaguchi et al. | .... | 188/322.17 |
| 6,640,943 B1 * | 11/2003 | Daws et al. | ............ | 188/322.17 |
| 2003/0070893 A1 | 4/2003 | Adrian et al. | | |
| 2004/0079602 A1 * | 4/2004 | Verriet | ................... | 188/322.17 |
| 2004/0154888 A1 * | 8/2004 | Lisenker et al. | ............. | 188/284 |
| 2004/0206590 A1 * | 10/2004 | Harbu et al. | ........... | 188/322.16 |
| 2005/0023093 A1 * | 2/2005 | Leiphart et al. | ............. | 188/283 |

FOREIGN PATENT DOCUMENTS

| | | |
|---|---|---|
| DE | 198 19 827 | 2/2000 |
| DE | 101 51 023 | 2/2003 |
| DE | 102 16 323 | 3/2003 |
| DE | 102 16 323 A1 | 3/2003 |
| DE | 102 16 323 B4 | 3/2005 |
| DE | 10 2005 009 151 | 9/2005 |
| DE | 10 2005 009 151 | 9/2006 |

\* cited by examiner

*Primary Examiner*—Christopher P Schwartz
(74) *Attorney, Agent, or Firm*—Cohen Pontani Lieberman & Pavane LLP

(57) ABSTRACT

A rod guide for use in a piston/cylinder monotube shock absorber includes an annular guide body disposed about the piston rod within the shock absorber cylinder. A rod scraper in a top face of the guide body seals grease and oil inside the cylinder and prevents contaminants from entering the cylinder. A one-piece plastic insert, preferably formed of PPA or other rugged thermoplastic resin with a low coefficient of friction, is retained in a bottom face of the guide body. A rod seal on top of the insert, positioned within the guide body, further seals the cylinder against outward migration of shock oil from the cylinder as it slides along the piston rod and provides support for the rod guide, in both the axial and transverse directions, as the insert moves along and relative to the piston rod.

28 Claims, 2 Drawing Sheets

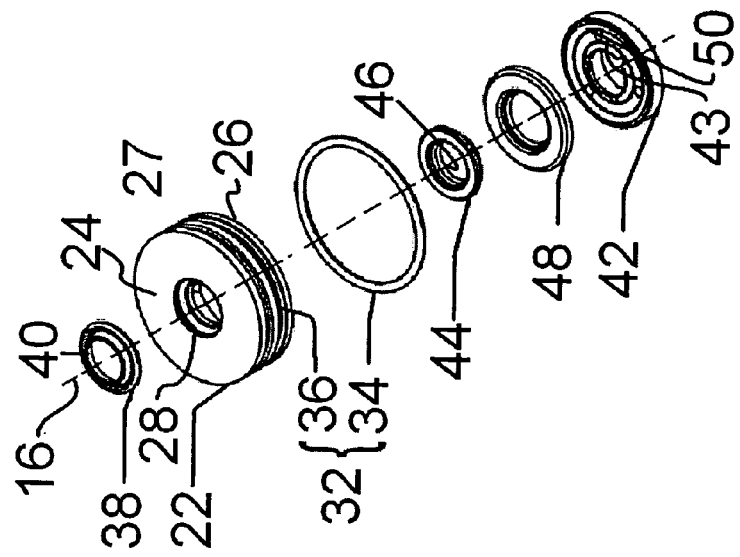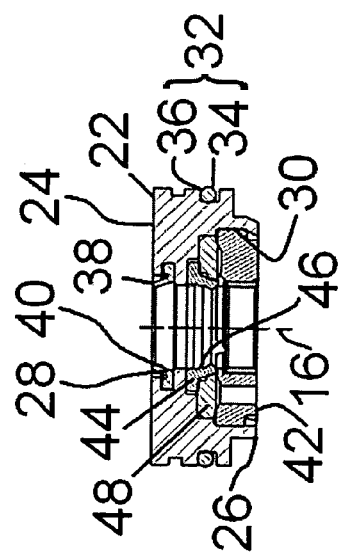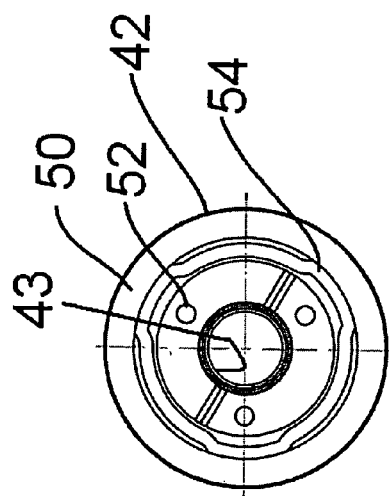

ROD GUIDE FOR MONOTUBE SHOCK ABSORBERS

BACKGROUND OF THE INVENTION

1. Field of the Invention

The present invention is directed to the field of shock absorbers and, more particularly, to a rod guide for use in a monotube shock absorber.

2. Description of the Related Art

Monotube shock absorbers are well-known devices for cushioning machines (such as vehicles) from vibration and sudden jolts. Such monotube shock absorbers are described, for example, in U.S. Pat. No. 6,253,661.

Monotube shock absorbers generally have a piston/cylinder unit in which a piston rod is slidably movable in a straight line along the longitudinal axis of a cylinder. A piston rod guide mounted within the cylinder provides a point of contact between the piston rod and the cylinder as the piston reciprocates within the cylinder. Thus, rod guides must be sufficiently stable and robust to withstand the environment in which they operate, which is often very hot and subject to forces and stresses in varying directions. The rod guides must also be easily slidable along the piston rod (i.e., they must have a low coefficient of friction with the piston rod), and provide a reliable seal to prevent contamination of the interior of the cylinder which could impair operation of the shock absorber.

Many known rod guides, such as those shown in U.S. Pat. No. 6,253,661 and in United States Published Patent Application Publ. No. US2003/0070893, are complicated assemblies with many parts, making them difficult and costly to assemble. In addition, in many such rod guides, the points of contact are formed of metal, such as sheet metal or aluminum with hardcoating, which has a relatively high coefficient of friction, as a result of which these rod guides are less efficient than desired. Many designs require side loads from the piston rod to contact an unlubricated bearing. Although some known rod guides with sheet metal bushings are therefore coated with a material having a lower coefficient of friction, such coatings wear off, leaving the metal bushing in direct contact with the piston rod, and consequent deterioration in performance of the shock absorber.

There is accordingly a need in the art for simple, inexpensive rod guides that provide improved coefficients of friction with respect to the piston rods with which they are used.

SUMMARY OF THE INVENTION

It is therefore an object of the invention to provide an improved rod guide for use in a piston/cylinder monotube shock absorber.

It is another object of the invention to provide a rod guide that is simple and inexpensive to manufacture, and easy to use.

It is a still further object of the invention to provide a rod guide which has a lower coefficient of friction with respect to the piston rod than known rod guides.

Briefly stated, a preferred embodiment of the invention provides a rod guide for use in a piston/cylinder monotube shock absorber, which includes an annular guide body having a throughbore disposed about the piston rod within the cylinder of the shock absorber. A rod scraper in a top face of the rod guide retains grease and oil inside the cylinder and keeps external contaminants from entering the cylinder. A one-piece plastic insert, preferably formed of PPA or other rugged thermoplastic resin with a low coefficient of friction, is located in a bottom face of the guide body. A rod seal on top of the insert, positioned within the guide body, seals the cylinder against the migration of shock oil from the cylinder as it slides along the piston rod. The insert provides support for the rod guide, in both the axial and transverse directions, as it moves relative to the piston rod.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, in which like numerals designate like elements throughout the several figures:

FIG. 2 is a cross-sectional cutaway of the rod guide of FIG. 1;

FIG. 3 is an exploded perspective of the elements of the rod guide of FIGS. 1 and 2; and FIG. 4 is a plan view of an insert of the rod guide of FIGS. 1-3.

DETAILED DESCRIPTION OF THE PRESENTLY PREFERRED EMBODIMENTS

Figure 1:
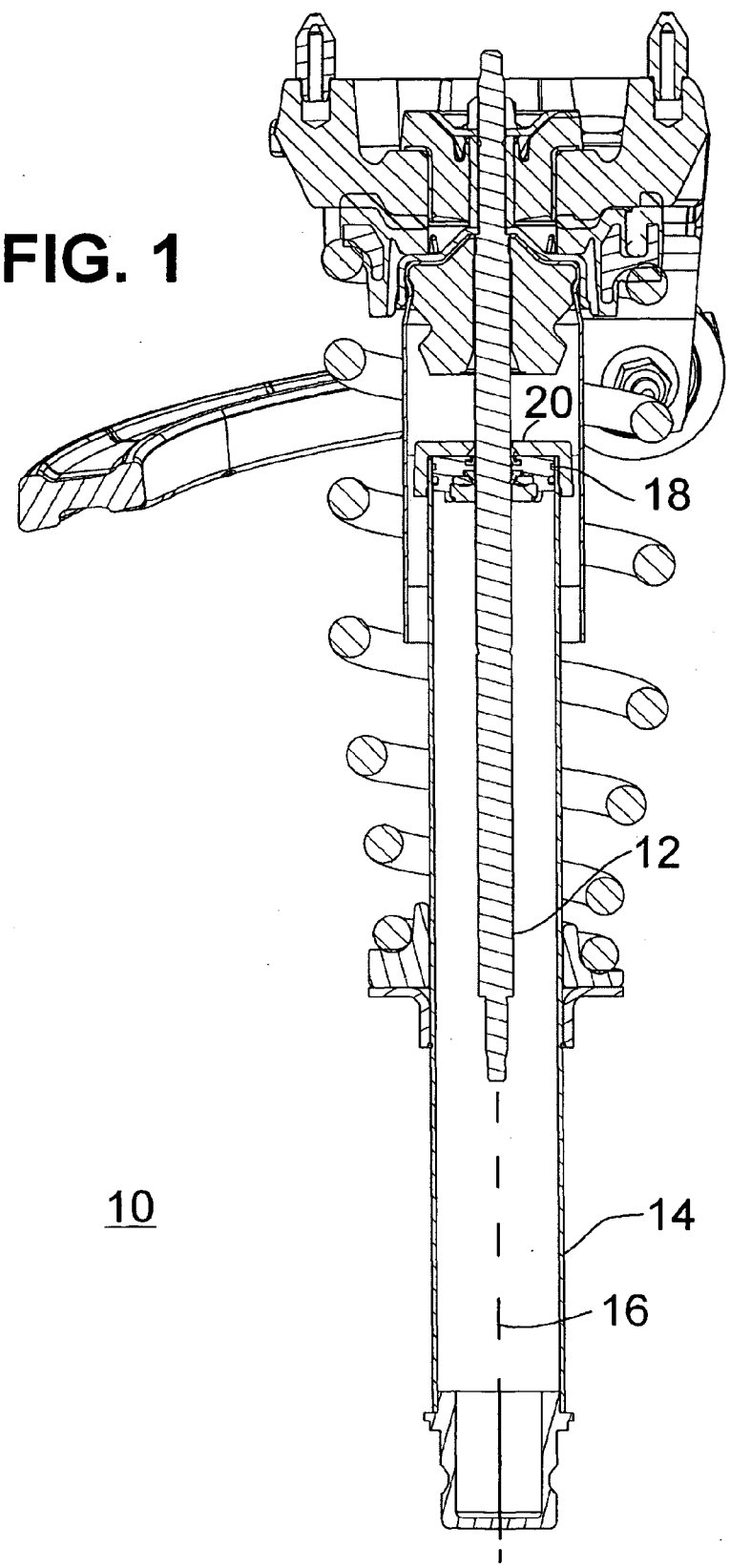
FIG. 1 is a cross-section of a generally conventional piston/cylinder shock absorber in which the inventive rod guide is disposed by way of illustrative example.

In FIG. 1, there is shown, generally at 10, a piston/cylinder monotube shock absorber in which a rod guide constructed in accordance with the invention may by way of example be operatively disposed. Shock absorber 10 includes a piston rod 12, mounted for example to a machine (not otherwise shown in detail), such as a vehicle body. Piston rod 12 is slidably mounted within a cylinder 14, for longitudinal sliding movement relative to cylinder 14 along the axis 16 of cylinder 14. Cylinder 14 conventionally contains a shock oil. Typically, all load bearing contact points are immersed in shock oil. This oil immersion helps to lubricate the components during use, and thereby reduces friction and wear on the moving parts.

A rod guide 18 is fixed to one end 20 of cylinder 14, positioned about piston rod 12. Rod guide 18 contacts piston rod 12 as rod 12 slides within cylinder 14, and provides support and stability for the assembly in both the axial and transverse directions when shock absorber 10 is in use.

A preferred construction of rod guide 18 is shown in more detail in FIGS. 2 and 3, and includes an annular guide body 22 with a top face 24, a bottom face 26 and a throughbore 27 therethrough. Top face 24 has a first recess 28, and bottom face 26 has a second recess 30, defined respectively therein. The inner diameter of guide body 22 is no less than the outer diameter of piston rod 12, and the outer diameter of guide body 22 is selected to assure a close fit to the inner diameter of cylinder 14. Guide body 22 seals the outer perimeter of rod guide 18 against the inner surface of cylinder 14 via a sealing means 32 of any known type. In a preferred embodiment, sealing means 32 includes an O-ring 34 positioned in a groove 36 defined about the exterior surface of guide body 22. In other embodiments, by way of illustrative example, multiple O-rings in multiple peripheral grooves may be employed, and/or sealing extensions may be fashioned on the exterior surface of guide body 22 to seal the interior of cylinder 14, generally as a matter of design choice.

An annular rod scraper 38, preferably formed of a resilient and durable material such as rubber, is positioned in first recess 28. Rod scraper 38 has an inner diameter which closely fits the outer diameter of piston rod 12 to, inter alia, seal the interior of cylinder 14 from the environment, prevent the leakage of lubricant from the interior of cylinder 14 to the environment, and prevent the migration of contaminants, such as dirt and debris, into contact with the seal 46 and the interior of cylinder 14. Rod scraper 38 preferably includes at least one lip 40 for facilitating and enhancing the slidable seal between piston rod 12 and rod guide 18. The exterior diameter of rod scraper 38 is dimensioned for a press fit engagement into first recess 28, and may be further secured therein by any suitable means such as a press fit, snap fit, or an adhesive. In a preferred embodiment, rod scraper 38 is crimped into its position in first recess 28.

An annular insert 42 is positioned in second recess 30. Insert 42 has an inner diameter that defines an insert throughbore 43 and has a Locational Clearance (LC) fit to the outer diameter of piston rod 12, and an outer diameter dimensioned for a Locational interference (LN) fit engagement into second recess 30. Insert 42 is preferably formed of a thermoplastic resin having a relatively low coefficient of friction (i.e., preferably lower than about 0.25) and, most preferably, is of a PPA (polyphthalamide) material which has a coefficient of friction of about 0.20. Insert 42 transmits loads imparted by piston rod 12, both axial and transverse, to rod guide 18. Insert 42 may be further secured in second recess 30 by any suitable means, such as aLocational interference (LN) fit, or an adhesive; in a preferred embodiment, insert 42 is crimped into its position in second recess 30.

Additional sealing protection may be afforded by an annular rod seal 44 positioned above insert 42 in second recess 30. Rod seal 44 is preferably of a frusto-conical shape, with a lower end 46 having an inner diameter dimensioned to closely fit the outer diameter of piston rod 12. Rod seal 44 may also be formed of any suitable resilient and durable material; one such suitable material is a synthetic high-performance rubber sold by DuPont Performance Elastomers LLC under the trade name Viton®.

While it is preferred that rod guide 18 include both rod scraper 38 and rod seal 44, since the presence of both provides additional safeguards against leakage and contamination, less preferred constructions of the inventive rod guide may incorporate only one of the two.

It is also preferred that a small amount (appx. 0.7 gm) of a lubricant (not shown), such as grease, be applied to the interior of the rod guide between rod scraper 38 and rod seal 44.

In a preferred embodiment, rod seal 44 is positioned on a retainer, such as a washer 48, which is positioned atop insert 42. Washer 48 is preferably formed of a resilient material such as NBR (nitrile butadiene rubber). In such construction of the rod guide 18, washer 48 may be positioned within a third recess 50 (FIG. 3) defined in the top of insert 42.

Also in the preferred embodiment, insert 42 may be provided with holes 52 which extend through insert 42 to facilitate the passage of shock oil therethrough to avoid a large increase in pressure when the shock absorber is in use. Similarly, insert 42 may be provided with grooves 54, as is conventional, to facilitate the flow of shock oil about and through insert 42 during use.

Rod guide 18 enables particular ease of assembly, since its major components are simply placed together and snapped into place, with simple crimping in preferred embodiments performed at the end of the process.

The embodiments of rod guide 18 as herein described are inexpensive to manufacture due, in part, to the use of fewer and less expensive components as compared to many prior art rod guides, yet offer an advantageously high loading capability. The use of a one-piece plastic insert, such as insert 42, in lieu of traditional metal components for contact with the piston rod lowers the overall friction developed between the rod guide 18 and piston rod 12. A lower performance option would be to make the insert out of a powder metal insert, which would result in increased friction. Furthermore, the inclusion of the two types of seals—as implemented by scraper 38 and rod seal 44—provides improved sealing between the interior of cylinder 24 and the environment, thereby optimizing the operating life of shock absorber 10 under even the harshest of conditions. Finally, the compact design of rod guide 18 notably improves the overall performance of any shock absorber 10 in which it is operatively present.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A rod guide for a monotube shock absorber that includes a piston rod, a cylinder disposed for movement relative to the piston rod and shock oil contained in the cylinder, said rod guide being operatively disposed within the cylinder and about the piston rod and comprising:

a guide body peripherally sized for a close fit with an inner wall of the cylinder and having a central throughbore and a first recess defined in the central throughbore at a bottom of said guide body, said guide body being mounted in fluid-sealing engagement with the inner wall of the cylinder;

a unitary insert body sized for a frictional fit with and disposed in said first recess and having an insert throughbore sized for fluid-sealing receipt therethrough of the piston rod, said insert body being formed of a plastic material having a coefficient of friction of less than approximately 0.25, the insert body defining holes therethrough to facilitate passage of shock oil therethrough whereby large increases in pressure on the insert body are avoided; and a first sealing body disposed in said guide body for supplementing fluid-sealing contact between said rod guide and the piston rod.

2. The rod guide of claim 1, wherein said first sealing body includes a rod seal having an inner diameter which is sized for a close fit about the piston rod while permitting relative movement between the sealing body and piston rod, said rod seal being configured for receipt in said guide body between said insert body and a portion of said guide body.

3. The rod guide of claim 2, further comprising a retainer disposed between said insert body and said rod seal; and wherein said guide body is a unitary element.

4. The rod guide of claim 3, wherein said retainer has a recess defined therein in which said rod seal is disposed.

5. The rod guide of claim 1,
wherein said guide body further includes a second recess defined in said central throughbore in a top of said guide body; and
wherein said rod guide further comprises a rod scraper having an interior diameter sized for a tight fit about the piston rod, said rod scraper being disposed in said second recess.

6. The rod guide of claim 5, wherein said rod scraper is positionally fixed in said guide body.

7. The rod guide of claim 6, further comprising a mechanical crimp to fix said rod scraper in said second recess.

8. The rod guide of claim 5, wherein said rod scraper has a lip configured to slidably engage the piston rod and to provide a seal against ingress of contaminants into the cylinder and a seal against egress of shock oil from the cylinder.

9. The rod guide of claim 5, wherein said sealing body further includes an annular rod seal sized for a close fit about the piston rod while permitting relative movement between the annular rod seal and piston rod, said rod seal being configured for receipt in said first recess of said guide body between said insert and said guide body.

10. The rod guide of claim 1, wherein said insert is positionally fixed in said first recess.

11. The rod guide of claim 10, further comprising a mechanical crimp to fix said insert in said first recess.

12. The rod guide of claim 1, wherein said guide body includes a peripheral groove for receiving a sealing component for fluid-sealing engagement with the cylinder inner wall.

13. The rod guide of claim 12, wherein said sealing component comprises an O-ring.

14. The rod guide of claim 1, wherein said plastic material comprises PPA.

15. A monotube shock absorber comprising:
a cylinder having an axis;
a piston rod slidably mounted along said axis of said cylinder, and partially disposed within said cylinder;
a rod guide operatively disposed within said cylinder and about said piston rod and having:
a guide body peripherally sized for a close fit with an inner wall of the cylinder and having a central throughbore and a first recess defined in the central throughbore at a bottom of said guide body, said guide body being mounted in fluid-sealing engagement with the inner wall of said cylinder;
a unitary insert body sized for a frictional fit with and disposed in said first recess and having an insert throughbore sized for fluid-sealing receipt therethrough of said piston rod, said insert body being formed of a plastic material having a coefficient of friction of less than approximately 0.25, the insert body defining holes therethrough to facilitate passage of shock oil therethrough whereby large increases in pressure on the insert body are avoided; and
a first sealing body disposed in said guide body for supplementing fluid-sealing contact between said rod guide and said piston rod.

16. The shock absorber of claim 15, wherein said first sealing body includes a rod seal having an inner diameter which is sized for a close fit about the piston rod while permitting relative movement between the sealing body and piston rod, said rod seal being configured for receipt in said guide body between said insert body and a portion of said guide body.

17. The shock absorber of claim 16, further comprising a retainer disposed between said insert body and said rod seal; and
wherein said guide body is a unitary element.

18. The shock absorber of claim 17, wherein said retainer has a recess defined therein in which said rod seal is disposed.

19. The shock absorber of claim 15,
wherein said guide body further includes a second recess defined in said central throughbore in a top of said guide body; and
wherein said rod guide further comprises a rod scraper having an interior diameter sized for a tight fit about the piston rod, said rod scraper being disposed in said second recess.

20. The shock absorber of claim 19, wherein said rod scraper is positionally fixed in said guide body.

21. The shock absorber of claim 20, further comprising a mechanical crimp to fix said rod scraper in said second recess.

22. The shock absorber of claim 19, wherein said rod scraper has a lip configured to slidably engage the piston rod and to provide a seal against ingress of contaminants into the cylinder and a seal against egress of shock oil from the cylinder.

23. The shock absorber of claim 19, said sealing body further includes an annular rod seal sized for a close fit about the piston rod while permitting relative movement between the annular rod seal and piston rod, said rod seal being configured for receipt in said first recess of said guide body between said insert and said guide body.

24. The shock absorber of claim 15, wherein said insert is positionally fixed in said first recess.

25. The shock absorber of claim 24, further comprising a mechanical crimp to fix said insert in said first recess.

26. The shock absorber of claim 15, wherein said guide body includes a peripheral groove for receiving a sealing component for fluid-sealing engagement with the cylinder inner wall.

27. The shock absorber of claim 26, wherein said sealing component comprises an O-ring.

28. The shock absorber of claim 15, wherein said plastic material comprises PPA.

* * * * *